United States Patent [19]
King

[11] 3,797,940
[45] Mar. 19, 1974

[54] REFRACTOMETER WITH DISPLACEMENT MEASURED POLARIMETRICALLY
[75] Inventor: Raymond John King, Teddington, England
[73] Assignee: National Research Development Corporation, London, England
[22] Filed: Dec. 8, 1971
[21] Appl. No.: 206,080

[30] Foreign Application Priority Data
Dec. 9, 1970  Great Britain.................... 58556/70

[52] U.S. Cl................................. 356/134, 356/114
[51] Int. Cl. ........................................... G01n 21/46
[58] Field of Search .......................... 356/114, 128 T

[56] References Cited
UNITED STATES PATENTS
3,090,222  5/1963  Akaboshi et al..................... 356/134
3,023,814  11/1971  Buhrer................................ 356/114

Primary Examiner—John K. Corbin
Assistant Examiner—Conrad Clark
Attorney, Agent, or Firm—Cushman, Darby and Cushman

[57] ABSTRACT

A refractometer in which a monochromatic light beam passes through a test specimen so as to be displaced, either translationally or rotationally, in dependence of the refractive index of the specimen. The beam is linearly polarised and is subjected to optical rotation through an angle depending on the extent of the displacement, the optical rotation being measured with a polarimeter to give a measure of refractive index.

3 Claims, 8 Drawing Figures

REFRACTOMETER WITH DISPLACEMENT MEASURED POLARIMETRICALLY

This invention relates to refractometers, and has as one object the provision of an instrument suitable for making accurate measurements of refractive index while being readily adapted for automatic operation.

According to the invention, a refractometer comprises means for passing a substantially monochromatic beam of light through a test specimen in such a manner that the beam is displaced from a datum position to an extent dependent on the refractive index of the specimen, the beam being linearly polarised at least after its passage through the specimen, means for subjecting the beam to optical rotation through an angle dependent on the extent of the displacement, and a polarimeter arranged to measure the optical rotation.

It is to be understood that in this Specification the term "light" includes ultra-violet and infra-red radiation as well as visible light, and the term "optical rotation" means rotation of the plane of vibration of linearly polarized light.

The layout of the refractometer may advantageously be arranged so that the polarimeter can be used alternatively to investigate the optical activity of test specimens. Preferably, the polarimeter is of a type utilising the Faraday effect, such as is described for example in British Patent Specification No. 882,244, and may suitably be in the form of an automatic recording instrument.

The displacement of the beam of light may be either translational or rotational, that is the beam may either be shifted sideways over a distance dependent on the refractive index or be deviated through an angle dependent on the refractive index.

Various embodiments of the invention will now be described by way of example, with particular reference to refractometers suitable for measuring the refractive indices of liquids such as sugar solutions.

It will be appreciated, however, that similar arrangements may be utilised for measuring the refractive indices of solids.

In the following description, reference will be made to the accompanying drawings, in which:

FIGS. 1(a) and 1(b) are sectional views of alternative forms of sample cell for use in refractometers according to the invention;

Figure 1A:
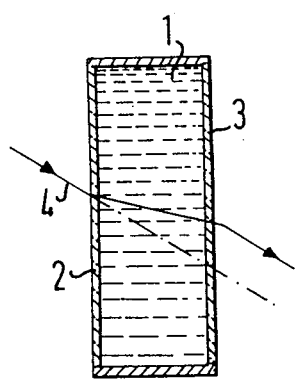

Considering first refractometers in which translational displacement of a beam of light is used, a simple form of cell for continuing a liquid to be tested is shown in FIG. 1(a); in this cell the liquid 1 is contained between two parallel thin planar walls 2 and 3 of a transparent material such as glass or silica. In use, a beam 4 of substantially monochromatic light is arranged to pass through the cell, the beam 4 being incident non-perpendicularly on the wall 2 and emerging from the wall 3 along a path parallel to but displaced from its original path, the distance over which the beam 4 is displaced being dependent upon the refractive index of the liquid 1. For simplicity, the beam 4 is indicated in FIG. 1(a), as in other Figures, by a single line; in practice it will of course have a finite width.

Figure 1B:
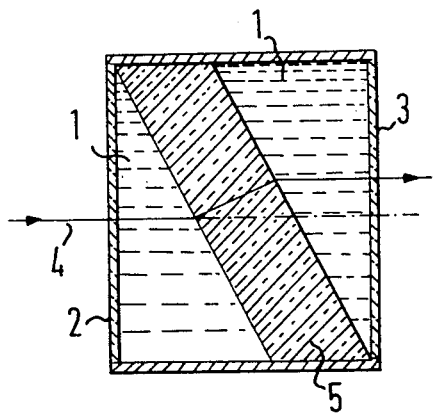

The simple form of cell shown in FIG. 1(a) suffers from certain disadvantages. Firstly, the variation of the beam displacement with a change of refractive index of the liquid 1 is markedly non-linear. Secondly, for reasons which will appear from the following description, it may be desired to place the cell in a part of the optical system of the refractometer in which the beam 4 is polarised and in this case difficulties can arise because of significant optical rotation effects at the air-solid interfaces, through which the beam 4 necessarily passes non-perpendicularly. An alternative form of cell, which is improved in these respects, is shown in FIG. 1(b). The cell again includes two parallel thin planar walls 2 and 3 but in this case the space between them is divided by a thick parallel-sided transparent plate 5 inclined to the walls 2 and 3 (suitably at an angle of about 30°), so as to form two similar compartments of triangular cross-section in which the liquid 1 is disposed. In this case the beam 4 is directed into the cell perpendicular to the wall 2, and is thus deviated only at the interfaces between the liquid 1 and the plate 5, at which optical rotation effects will normally be smaller than for air-solid interfaces because of a smaller difference in refractive index. Further, the variation of the distance over which the beam 4 is displaced with a change in the refractive index of the liquid 1 is much more linear than is the case with the cell shown in FIG. 1(a).

Figure 2:
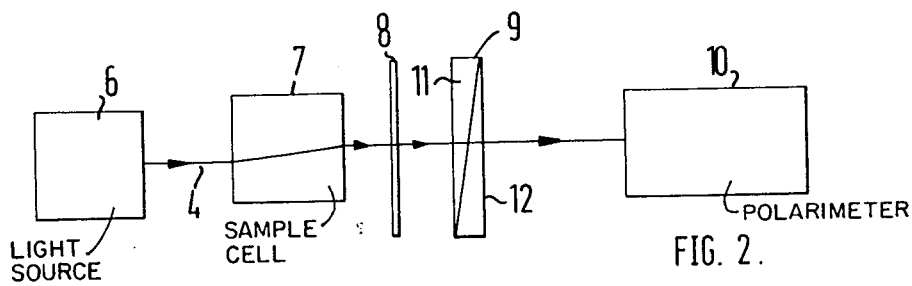
FIG. 2 is a diagram showing the layout of a first form of refractometer employing a cell as shown in FIG. 1(a) or 1(b)

FIG. 2 illustrates the layout of a simple form of refractometer employing a sample cell such as is shown in FIG. 1(a) or 1(b). The beam 4 is derived from a source 6 (which may for example comprise a quartz-iodine lamp, an interference filter and a suitable lens system), and after passing through the sample cell 7 is arranged to pass through a polariser 8 and an optical rotation device 9 to a polarimeter 10 arranged to measure the amount of optical rotation to which the beam 4 is subjected by the device 9. This device is in the form of a transparent plate arranged with its main faces perpendicular to the beam 4, the plate consisting of two similar wedges 11 and 12 cemented together; the wedge 11 is of crystalline quartz having its optic axis disposed perpendicular to the main faces of the plate and the wedge 12 is of glass having substantially the same refractive index as the quartz. It will be appreciated that the thickness of the quartz traversed by the beam 4, and hence the optical rotation to which the beam 4 is subjected by the device 9, will vary linearly with the displacement of the beam 4 imposed by the cell 7. For example, using a wedge angle of 10° with green light the change in optical rotation will be 0.44° for a shift of 0.1 mm in the position of the beam 4. If the sample cell 7 is of the type shown in FIG. 1(b), with the plate 5 being of silica one cm. in thickness and inclined at an angle of 30°, then for a measuring sensitivity of the polarimeter 10 of 0.001° the minimum detectable change in refractive index of the liquid 1 is approximately $5 \times 10^{-5}$. For a typical polarimeter utilising the Faraday effect the full scale range of measurement would correspond to a refractive index difference of 0.05 and this could be centered on any desired value of refractive index by appropriate setting of the analyser of the polarimeter.

Besides its simplicity the arrangement shown in FIG. 2 has the advantage that any optical rotation due to optical activity of the liquid 1 or preferential reflection/transmission effects at the interfaces of the cell 7 will not affect the polarimetric balance. It does, however, require that the width of the beam 4 when passing through the device 9 should be restricted to about 0.1 mm, in order to avoid an excessive spread of the optical rotation for different rays of the beam 4. From energy considerations, it would appear unlikely that this requirement could be met satisfactorily when using a collimated beam, and it would therefore probably be necessary to use a focussed beam having its minimum width at the device 9, the beam being restricted to a cone of semi-angle about 3°. When using such an arrangement, the effects of any axis wander in the polariser 8 can be reduced by increasing the distance between it and the device 9, so that the polariser 8 is located in a region where the beam diameter is relatively large.

Figure 3:
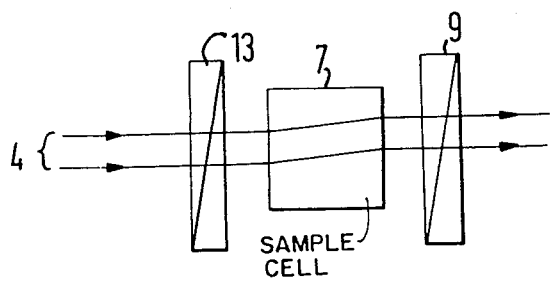
FIG. 3 is an explanatory diagram.

The restriction on the width of the beam 4 can be avoided by modifying the arrangement shown in FIG. 2 so that before its passage through the cell 7 the beam 4 is polarised and is arranged to pass through a further optical rotation device which is complementary to the device 9 in respect of the variation of the optical rotation across the width of the beam. The principle of such an arrangement is illustrated in FIG. 3, in which the further optical rotation device 13 is the same as the device 9 except that it utilises quartz of the opposite hand to that of the device 9. It will be appreciated from FIG. 3 that the difference in path lengths through the quartz in the devices 9 and 13, and hence the net optical rotation, will be the same for all rays of a collimated beam 4. Variation of the refractive index of the liquid in the cell 7 will of course result in a corresponding variation in the net optical rotation. If desired, the device 13 may be replaced by a device identical in all respects to the device 9 followed by a half-wave plate (not shown).

Figure 4:
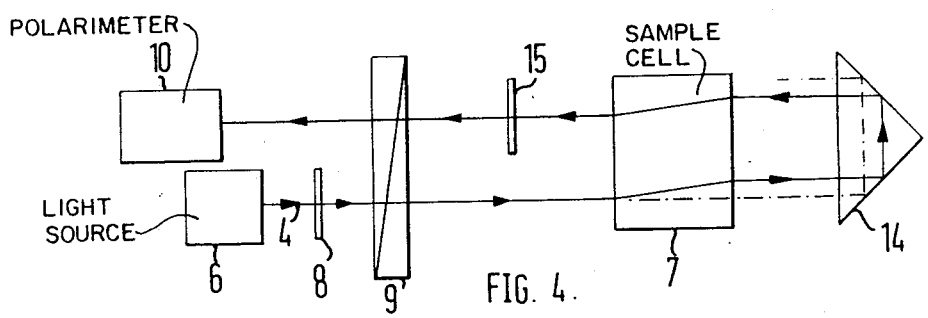
FIG. 4 is a diagram showing the layout of a second form of refractometer employing a cell as shown in FIG. 1(a) or 1(b)

The basic arrangement shown in FIG. 3 is of limited practical value, since it suffers from the disadvantage that the reading of the polarimeter will be affected by any optical activity in the liquid. In order to overcome this disadvantage, it is necessary to arrange for the beam to pass twice through the liquid in such a manner that the effects of any optical activity in the liquid are in opposition for the two passages. This may be conveniently arranged by causing the beam to pass twice through a single sample cell in opposite directions, in which case it is also convenient for the beam to pass twice through a single optical rotation device performing the functions of both the devices 9 and 13 shown in FIG. 3. The layout of a refractometer incorporating these features is shown in FIG. 4, in which components similar to those incorporated in the arrangement of FIG. 2 are designated by similar reference numerals. In this case, the beam 4, after passing through the polariser 8 and making a first transit of the device 9 and the cell 7, is reflected by means of a roof prism 14 so as to make a second transit of the cell 7 and the device 9 before reaching the polarimeter 10. The reflecting faces of the roof prism 14 are coated so that there is 180° phase difference between the reflected components respectively vibrating parallel and perpendicular to the plane of incidence. As a result, the effects of any optical activity in the liquid in the cell 7 are in opposition for the two transits of the cell 7 and can be made to cancel exactly if the cell 7 and roof prism 14 are accurately fabricated and aligned. The optical rotations to which the beam 4 is subjected in the two transits of the device 9 are arranged to be effectively additive by disposing a half-wave plate 15 so that the beam 4 passes through it between the second transit of the cell 7 and the second transit of the device 9. The use of an additive arrangement, as opposed to the subtractive arrangement of FIG. 3, is necessary in order to ensure invariance of the total optical rotation across the width of the beam 4, because of the reversal of the beam 4 at the roof prism 14. The reversing action of the prism 14 also ensures that the effects of the displacements suffered by the beam 4 in the two transits of the cell 7 are additive when the beam 4 reaches the device 9 the second time.

Figure 5:
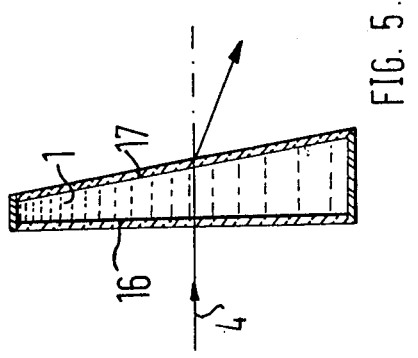
FIG. 5 is a sectional view of a further form of sample cell for use in refractometers according to the invention.

Turning now to the case of refractometers in which rotational displacement of a beam of light is used, a liquid to be tested may suitably be contained in the form of cell shown in FIG. 5; in this case the liquid 1 is contained between two thin planar transparent walls 16 and 17 which are inclined at a small angle. In use, the beam 4 is arranged to be incident on the wall 16, and emerges from the wall 17 along a path inclined to its original path at an angle dependent upon the refractive index of the liquid 1; the beam 4 can conveniently be arranged (as shown) to be incident perpendicularly on the wall 16, but it may be advantageous to arrange instead for the angle of incidence to correspond approximately to minimum deviation conditions for the passage of the beam 4 through the cell. It will be appreciated that as the refractive index of the liquid 1 is varied, the point on the wall 17 from which the beam 4 emerges will change slightly due to the finite thickness of the wall 17 but this effect is insignificant in comparison with the angular deviation. By simple calculation it can be shown that the deviation angle will vary substantially linearly with a change in the refractive index of the liquid 1 provided that the angle between the walls 16 and 17 is small; this angle may suitably have a value of about 10°.

Figure 6:
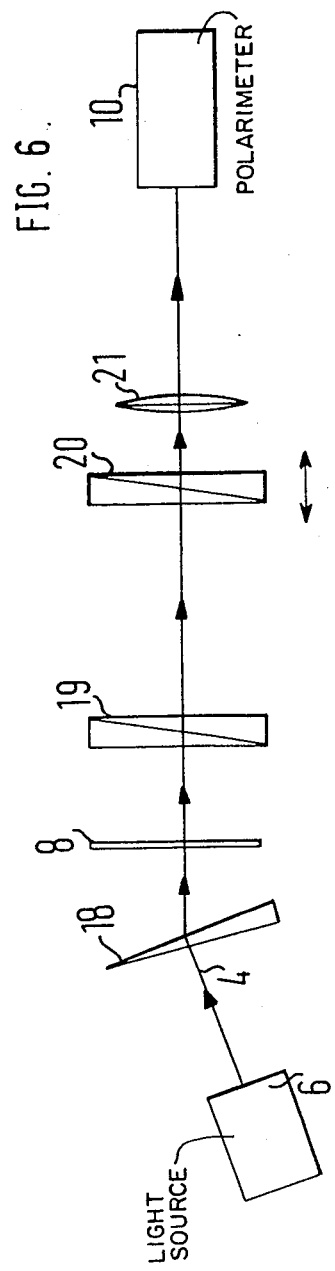
FIG. 6 is a diagram showing the layout of a refractometer employing a cell as shown in FIG. 5.

FIG. 6 illustrates the layout of a refractometer employing a sample cell such as is shown in FIG. 5. In this instrument a collimated beam 4, derived from the source 6, is arranged to pass through the sample cell 18, in which it is deviated, and then through a polariser 18 and two spaced apart optical rotation devices 19 and 20 to the polarimeter 10. The devices 19 and 20 are similar in form to the device 9, being identical except for respectively utilising quartz of opposite hands, and are disposed with their main faces perpendicular to that line (subsequently referred to as the axis of the instrument) along which the axis of the beam 4 lies on emerging from the cell 18 when the refractive index of the liquid 1 in the cell 18 has a value at the centre of the measurable range of refractive indices; the devices 19 and 20 are arranged similarly with respect to the axis of the instrument, so that this axis passes through equal thicknesses of quartz in the two devices. As before, the device 19 could be replaced by a device identical in all respects to the device 20 followed by a half-wave plate (not shown).

It will be appreciated that in general the beam 4 will pass through the devices 19 and 20 inclined at a small angle to the axis of the instrument, and in order to ensure that the position of the beam 4 at the analyser of the polarimeter 10 is substantially the same for any deviation angle within the relevant range a positive lens 21 is disposed between the device 20 and the polarimeter 10, the lens 21 being centred on the axis of the instrument. The difference between the path lengths through the quartz in the devices 19 and 20 (which will be substantially the same for all rays of the collimated beam 4), and hence the net optical rotation of the beam 4, will vary substantially linearly with the deviation angle of the beam 4 and hence with the refractive index of the liquid 1; the sense of the net optical rotation will of course differ for values of the refractive index above and below the centre of the measurable range. Using green light, if the angle between the walls 16 and 17 of the cell 18 is 10°, and the wedge angles of the devices 19 and 20 are also 10°, the change in the net optical rotation for a change $\Delta n$ in the refractive index of the liquid 1 will be equal to $(0.8x\, \Delta n)°$, where the spacing between the devices 19 and 20 is $x$mm. It will thus be appreciated that by adjusting the spacing between the devices 19 and 20 the measurable range of refractive indices and the minimum detectable difference in refractive indices can be varied. For a typical polarimeter utilising the Faraday effect, the full scale range of measurement would correspond to a refractive index difference of 0.05 for a value of $x = 25$, the minimum detectable change in refractive index (corresponding to a measuring sensitivity of the polarimeter 10 of 0.001°) then being approximately $5 \times 10^{-5}$.

The fact that the beam 4 will in general be inclined at a small angle to the axis of the instrument, and hence to the optic axis of the quartz in the devices 19 and 20, can result in ellipticity in the polarised beam 4 after its passage through the devices 19 and 20, which in extreme cases could affect the efficient functioning of the instrument. In practice it is found that this ellipticity can be reduced to an insignificant level by appropriate adjustment of the transmission azimuth of the polariser 8. Thus if the optical rotations to which a ray traversing the axis of the instrument is subjected in the devices 19 and 20 are respectively $+ \theta°$ and $- \theta°$, the polariser 8 should be oriented with its transmission azimuth at an angle of $-\theta/2°$ to the plane of FIG. 6 (or to that plane perpendicular to the plane of FIG. 6 which passes through the axis of the instrument).

The refractometer can conveniently be calibrated by using a reference liquid of accurately known refractive index in the cell 18 to provide one fixed point, and then introducing a wedge of glass or silica (not shown) immediately following the cell 18 to calibrate the refractive index range. The deviation of the light beam produced by this wedge can be measured independently and its refractive index equivalence determined.

Figure 7:
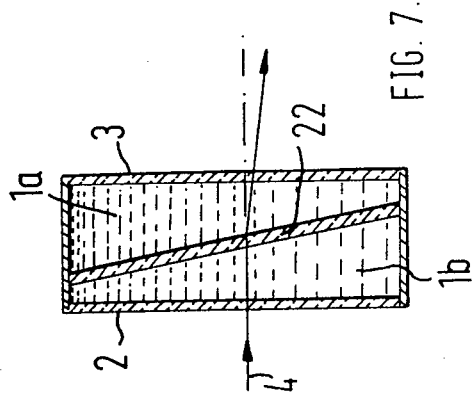
FIG. 7 is a sectional view of another form of sample cell which can be used in place of the cell shown in FIG. 5.

An alternative form of sample cell which may be used in a refractometer of the kind illustrated in FIG. 6 is shown in FIG. 7. The cell, which is somewhat similar in form to that shown in FIG. 1(b), includes two parallel thin planar walls 2 and 3, the space between which is divided by a thin planar transparent partition 22 inclined to the walls 2 and 3 at a small angle (suitably about 10°), so as to form two similar compartments in which are respectively contained two different liquids 1a and 1b. In passing through the cell the beam 4, which may conveniently be arranged to be incident perpendicularly on the wall 2, is deviated from its original path through an angle dependent upon the difference between the refractive indices of the liquids 1a and 1b. This form of cell may be used where it is desired to measure the difference in refractive index between two liquids, for example a dilute solution and its solvent, without accurate knowledge of the refractive index of either. Alternatively, it may be used to make an accurate measurement of the refractive index of one liquid, the other being a reference liquid of accurately known refractive index. In the latter case, the arrangement has the advantage of reduced temperature sensitivity compared with the use of a cell as shown in FIG. 5, since the effects of temperature changes on the refractive indices of the two liquids will be in opposition. Further, the variation of the deviation angle with a change in the unknown refractive index will be more linear (although of somewhat smaller magnitude) than is the case with the cell of FIG. 5.

It will be appreciated that the refractometer shown in FIG. 6 is only slightly more complex than that shown in FIG. 2 and, while having the same advantage in respect of lack of sensitivity to optical activity in the liquid under test, it is not subject to the same restriction in respect of the width of the beam. It is therefore considered preferable to the refractometer shown in FIG. 4. The polarimeter 10 of the refractometer shown in FIG. 6 can conveniently be used to investigate the optical activity of test specimens by inserting a conventional polarimeter cell (preferably preceded by a further polariser) between the lens 21 and the polarimeter 10.

I claim:

1. A refractometer comprising:
    means for passing a substantially monochromatic collimated beam of light through a test specimen in such a manner that the beam is rotationally displaced from a datum position to an extent dependent on the refractive index of the specimen;
    means for causing the beam to be linearly polarised after its passage through the specimen;
    means for subjecting the polarised beam to a net optical rotation through an angle dependent on the extent of the displacement, said optical rotation means comprising
    means for subjecting the beam to a first optical rotation of one sense in dependence on the passage of the beam through a first wedge of optically active material disposed so that its thickness tapers in a direction transverse to and coplanar with the axes of the possible paths of the beam, and
    means for subjecting the beam to a second optical rotation of the opposite sense in dependence on the subsequent passage of the beam through a second wedge of optically active material geometrically similar to and similarly disposed to said first widge; and
    a polarimeter arranged to measure said net optical rotation.

2. A refractometer comprising:
    means for passing a substantially monochromatic beam of light through a test specimen in such a manner that the beam is translationally displaced from a datum position to an extent dependent on the refractive index of the specimen, means for causing the beam to be linearly polarised both before and after its passage through the specimen, a first wedge of optically active material disposed in the path of the beam with the thickness of the wedge tapering in the direction, in which the beam is displaced in passing through the specimen, and compensating wedge means disposed in the path of the polarised beam before its passage through the specimen for compensating for the variation across the width of the beam of the optical rotation resulting from the passage of the beam through said first wedge after its passage through the specimen.

3. A refractometer comprising:

means for passing a substantially monochromatic beam of light through a test specimen twice in such a manner that the beam is displaced from a datum position to an extent dependent on the refractive index of the specimen and such that the effects of any optical activity in the specimen are in opposition for the two passages through the test specimen, means for causing the beam to be linearly polarised at least after its passage through the specimen, a first wedge of optically active material disposed in the path of the beam with the thickness of the wedge tapering in the direction in which the beam is displaced in passing through the specimen, a compensating wedge means disposed in the path of the polarised beam before its passage through the specimen for compensating for the variation across the width of the beam of the optical rotation resulting from the passage of the beam through said wedge after its passage through the specimen, and a polarimeter arranged to measure said optical rotation.

* * * * *